(12) United States Patent
Kawai

(10) Patent No.: US 11,778,308 B2
(45) Date of Patent: Oct. 3, 2023

(54) IMAGE PROCESSING APPARATUS, IMAGE PROCESSING METHOD, AND IMAGE CAPTURING APPARATUS

(71) Applicant: CANON KABUSHIKI KAISHA, Tokyo (JP)

(72) Inventor: Emi Kawai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/985,196

(22) Filed: Nov. 11, 2022

(65) Prior Publication Data

US 2023/0156309 A1 May 18, 2023

(30) Foreign Application Priority Data

Nov. 18, 2021 (JP) .................. 2021-188074

(51) Int. Cl.
*H04N 23/667* (2023.01)
*H04N 23/80* (2023.01)
*H04N 23/63* (2023.01)
*H04N 23/53* (2023.01)

(52) U.S. Cl.
CPC .......... *H04N 23/53* (2023.01); *H04N 23/632* (2023.01); *H04N 23/667* (2023.01); *H04N 23/80* (2023.01)

(58) Field of Classification Search
CPC ......... H04N 23/63–632; H04N 23/667; H04N 23/80–959; H04N 5/20–208; H04N 9/64; H04N 9/67; H04N 9/68; H04N 9/69; H04N 9/72; H04N 9/73; G06T 5/007–009
See application file for complete search history.

(56) References Cited

U.S. PATENT DOCUMENTS

| | | | |
|---|---|---|---|
| 2006/0158536 A1* | 7/2006 | Nakayama | H04N 23/667 348/E5.037 |
| 2014/0368527 A1* | 12/2014 | Fujine | G09G 3/3413 345/589 |
| 2017/0127034 A1* | 5/2017 | Urisaka | H04N 5/202 |
| 2021/0289143 A1* | 9/2021 | Shiozaki | H04N 23/663 |

FOREIGN PATENT DOCUMENTS

JP 2010-245924 A 10/2010

* cited by examiner

*Primary Examiner* — Paul M Berardesca
(74) *Attorney, Agent, or Firm* — Cowan, Liebowitz & Latman, P.C.

(57) ABSTRACT

An image processing apparatus that generates, from an image data obtained through shooting, image data for display that depends on a display mode being set is disclosed. The image processing apparatus applies, in generation of the image data for display, a tone characteristic that depends on the display mode being set, to the image data. The image processing apparatus controls strength of noise reduction processing and/or sharpness processing depending on a combination of a tone characteristic applied to the image data and a display mode being set.

13 Claims, 7 Drawing Sheets

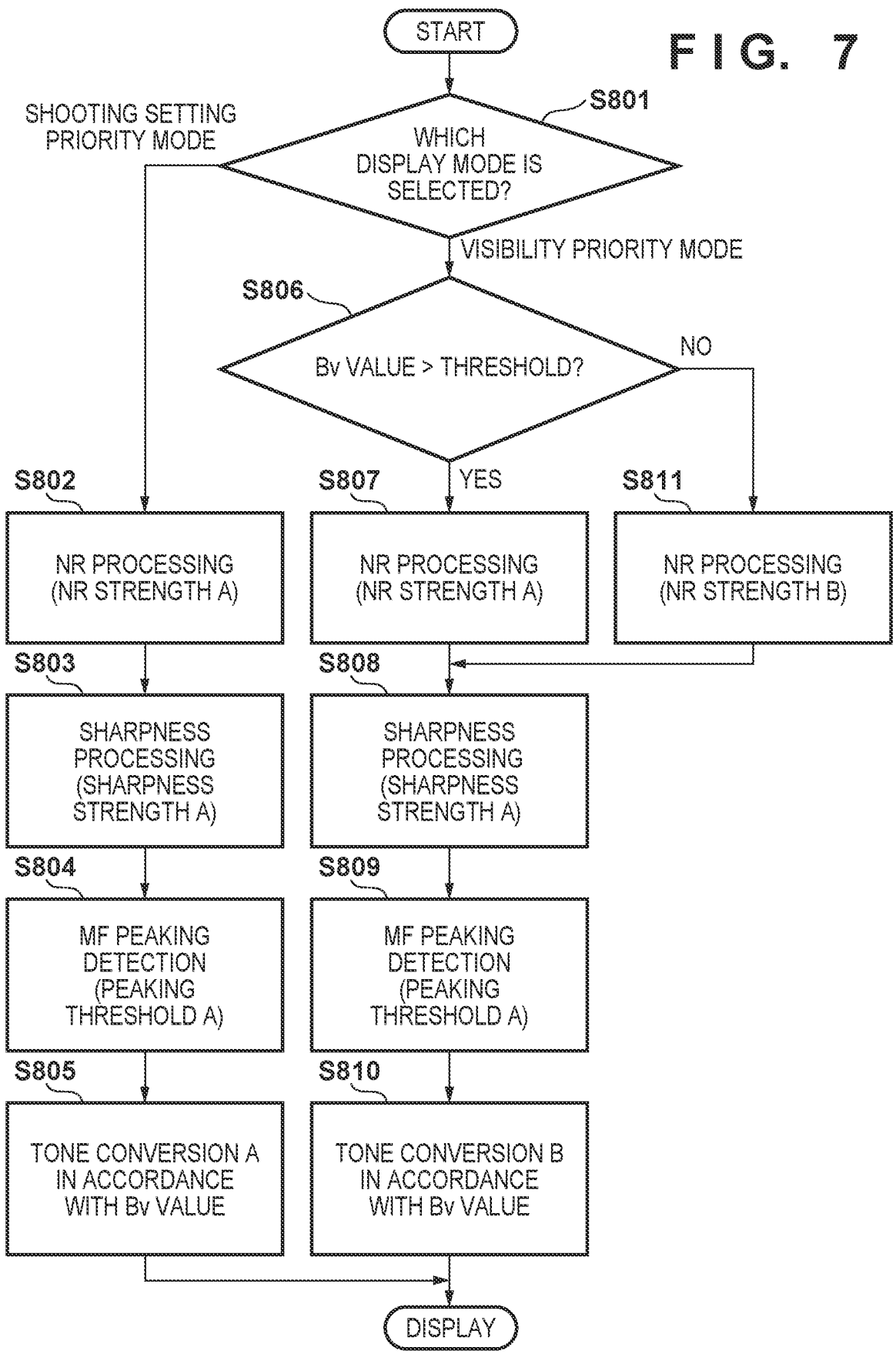

IMAGE PROCESSING APPARATUS, IMAGE PROCESSING METHOD, AND IMAGE CAPTURING APPARATUS

BACKGROUND OF THE INVENTION

Field of the Invention

The present invention relates to an image processing apparatus, an image processing method, and an image capturing apparatus.

Description of the Related Art

Electronic viewfinders (EVFs), unlike optical viewfinders, are able to display processed images. Thus, for example, displaying an image reflecting current shooting conditions on an EVF is advantageous in that the image to be obtained through shooting can be confirmed before shooting. Japanese Patent Laid-Open No. 2010-245924 discloses applying processing for enhancing visibility to an image to be displayed on an EVF.

When it is possible to select whether to process an image that will be displayed on the EVF and to select multiple display modes in which the type of processing or the like differs, a difference in resolution, amount of noise and the like of the display image may be felt when switching between display modes.

SUMMARY OF THE INVENTION

The present invention, in one aspect thereof provides an image processing apparatus and an image processing method capable of generating image data for display in which a difference in an image between display modes is not noticeable.

According to an aspect of the present invention, there is provided an image processing apparatus comprising: one or more processors that, when executing a program stored in a memory, function as: an acquisition unit configured to acquire image data obtained through shooting; and a generation unit configured to generate, from the image data, image data for display that depends on a display mode being set, wherein the generation unit in generation of the image data for display, applies a tone characteristic that depends on the display mode being set, to the image data, and in a case where a tone characteristic to be applied to the image data while a first display mode is set is a tone characteristic that darkens an image compared to a tone characteristic to be applied to the image data while a second display mode is set, weakens noise reduction processing to be applied to the image data compared to noise reduction processing to be applied to the image data while the second display mode is set, and/or strengthens sharpness processing to be applied to the image data compared to sharpness processing to be applied to the image data while the second display mode is set.

According to another aspect of the present invention, there is provided an image capturing apparatus comprising: an image sensor; and an image processing apparatus configured to process image data obtained through shooting that uses the image sensor, wherein the image processing apparatus comprising: one or more processors that, when executing a program stored in a memory, function as: an acquisition unit configured to acquire image data obtained through shooting; and a generation unit configured to generate, from the image data, image data for display that depends on a display mode being set, wherein the generation unit in generation of the image data for display, applies a tone characteristic that depends on the display mode being set, to the image data, and in a case where a tone characteristic to be applied to the image data while a first display mode is set is a tone characteristic that darkens an image compared to a tone characteristic to be applied to the image data while a second display mode is set, weakens noise reduction processing to be applied to the image data compared to noise reduction processing to be applied to the image data while the second display mode is set, and/or strengthens sharpness processing to be applied to the image data compared to sharpness processing to be applied to the image data while the second display mode is set.

According to a further aspect of the present invention, there is provided an image processing method for execution by an image processing apparatus, the method comprising: acquiring image data obtained through shooting; and generating, from the image data, image data for display that depends on a display mode, wherein, in the generating, in generation of the image data for display, noise reduction processing, sharpness processing and a tone characteristic that depends on the display mode are applied to the image data, and in a case where a tone characteristic to be applied to the image data in a first display mode is a tone characteristic that darkens an image compared to a tone characteristic to be applied to the image data in a second display mode, noise reduction processing to be applied to the image data is weakened compared to noise reduction processing to be applied to the image data while the second display mode is set, and/or sharpness processing to be applied to the image data is strengthened compared to sharpness processing to be applied to the image data while the second display mode is set.

According to another aspect of the present invention, there is provided a non-transitory computer-readable medium storing a program for causing a computer, when executing the program, to function as an image processing apparatus comprising: an acquisition unit configured to acquire image data obtained through shooting; and a generation unit configured to generate, from the image data, image data for display that depends on a display mode being set, wherein the generation unit in generation of the image data for display, applies a tone characteristic that depends on the display mode being set, to the image data, and in a case where a tone characteristic to be applied to the image data while a first display mode is set is a tone characteristic that darkens an image compared to a tone characteristic to be applied to the image data while a second display mode is set, weakens noise reduction processing to be applied to the image data compared to noise reduction processing to be applied to the image data while the second display mode is set, and/or strengthens sharpness processing to be applied to the image data compared to sharpness processing to be applied to the image data while the second display mode is set.

Further features of the present invention will become apparent from the following description of exemplary embodiments (with reference to the attached drawings).

BRIEF DESCRIPTION OF THE DRAWINGS

FIG. 7 is a flowchart relating to noise adjustment processing in another variation.

DESCRIPTION OF THE EMBODIMENTS

Figure 1:
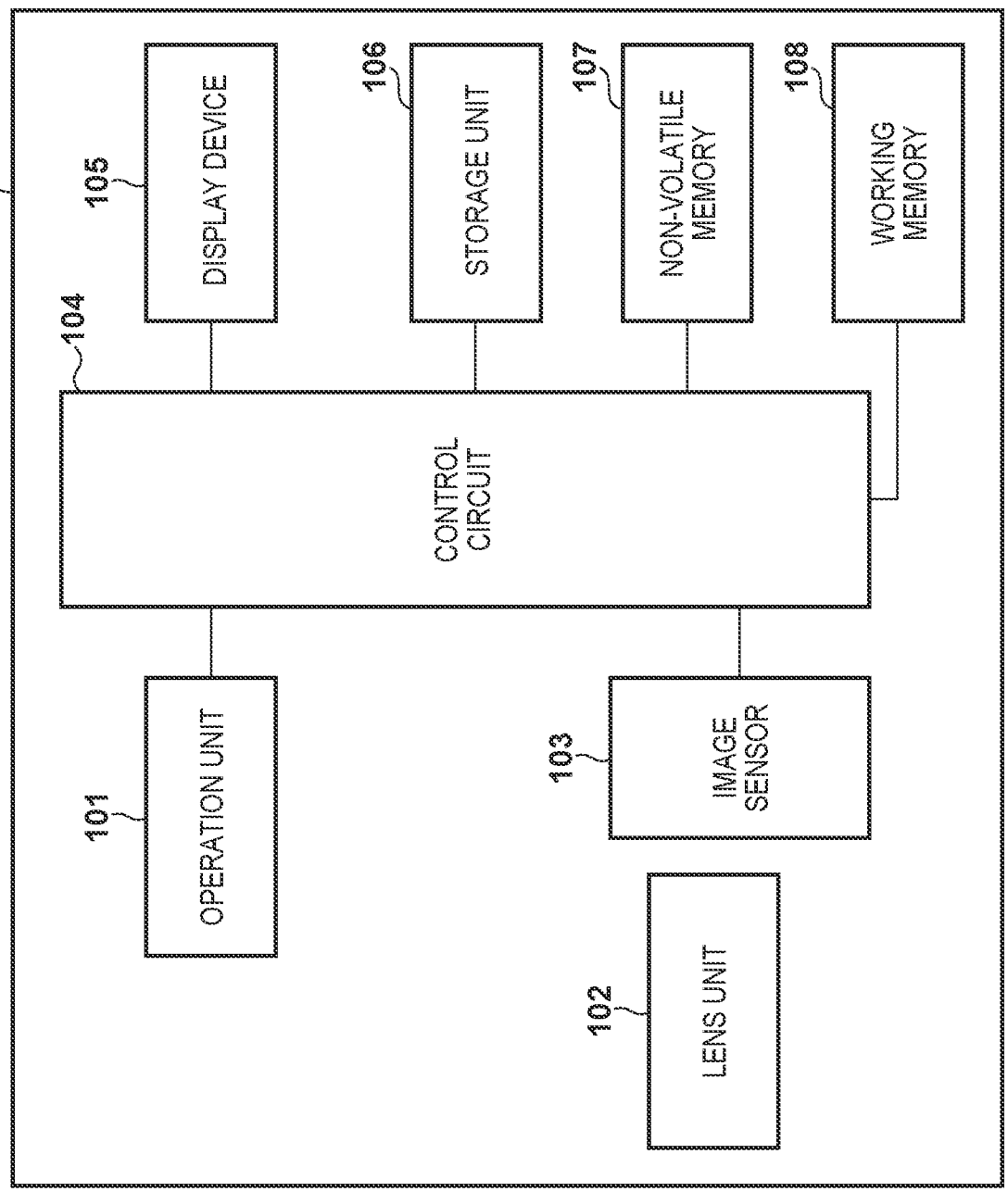
FIG. 1 is a block diagram lustrating an example functional configuration of a digital camera serving as one example of an image processing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that, hereinafter, a configuration in which the present invention is applied to EVF display of a digital camera will be described. However, the present invention can also be implemented with any electronic device capable of generating display images. Such electronic devices include computer devices (personal computers, tablet computers, media players, PDAs, etc. mobile phones, smartphones, game consoles, drive recorders, and head-mounted displays (HMDs). These are illustrative examples and the present invention can also be implemented with other electronic devices.

Configuration of Digital Camera

FIG. 1 is a block diagram showing an example functional configuration of a digital camera (hereinafter, camera) 100 serving as an example of an image processing apparatus according to an embodiment of the present invention.

An operation unit 101 is a generic term for input devices (buttons, switches, dials, etc.) provided for the user to input various instructions to the camera 100. The input devices constituting the operation unit 101 have names that depend on the functions allocated thereto. For example, the operation unit 101 includes a release switch, a moving image record switch, a shooting mode select dial for selecting a shooting mode, a menu button, arrow keys, and an enter key.

The release switch is a switch for still image recording, and a control circuit 104 recognizes a half-press state of the release switch as a shooting preparation instruction and the full-press state as a shooting start instruction. Also, the control circuit 104 recognizes a moving image recording start instruction when the moving image record switch is pressed in a shooting standby state, and recognizes a recording stop instruction when the moving image record switch is pressed during moving image recording.

Note that the functions that are allocated to the same input device are changeable. The input device may also be a software button or key that uses a touch display. The operation unit 101 may also include an input device that supports a non-contact input method, such as voice input or line-of-sight input.

A lens unit 102 has a plurality of optical lenses including one or more moving lenses and also has a diaphragm. The moving lenses include a focus lens, a vibration reduction lens, and a zoom lens. The lens unit 102 also has a configuration for driving the moving lenses and the diaphragm, such as a motor or actuator. Note that, in the present embodiment, the lens unit 102 is integrated with the camera 100, and operations of the lens unit 102 are controlled by the control circuit 104.

In the case where the lens unit 102 is an interchangeable lens that is detachable, a control circuit is provided in the lens unit 102. Operations of the lens unit 102 are controlled by the control circuit 104 through communication with the control circuit in the lens unit 102.

An image sensor 103 may be a known CCD or CMOS color image sensor having color filters in a primary-color Bayer array, for example. The image sensor 103 has a pixel array in which a plurality of pixels are arrayed two-dimensionally, and a peripheral circuit for reading out signals from the pixels. Each pixel stores an electric charge that depends on the amount of incident light by photoelectric conversion. By reading out a signal having a voltage that depends on the amount of charge stored during an exposure period from each pixel, a pixel signal group (analog image signal) representing a subject image formed on an image capturing surface by the lens unit 102 is obtained.

The control circuit 104 has one or more processors capable of executing programs. The control circuit 104 realizes the functions of the camera 100, by loading programs stored in a non-volatile memory 107 into a working memory 108 and executing the loaded programs to control operations of the function blocks, for example. Note that some of the operations that are executed by the control circuit 104 in the following description may be executed by a dedicated circuit such as an ASIC.

The control circuit 104 applies image processing determined in advance to analog image signals read out from the image sensor 103, and generates image data for display or recording, detects feature regions, acquires and/or generates various evaluation values, and the like.

Here, the image processing that is applied by the control circuit 104 includes preprocessing, color interpolation processing, correction processing, detection processing, data processing, evaluation value calculation processing, and special effects processing.

Preprocessing includes A/D conversion, signal amplification, reference level adjustment, and defective pixel correction.

Color interpolation processing, also referred to as demosaic processing, is processing for interpolating the values of color components that are not obtained during shooting.

Correction processing includes processing such as white balance adjustment, tone correction, correction of image degradation caused by optical aberration of the lens unit 102 (image recovery), correction of the effects of vignetting of the lens unit 102, and color correction.

The detection processing includes detection of a feature region (e.g., face region or human body region) and movement thereof, and person recognition processing.

Data processing includes processing such as synthesis, scaling, encoding, and decoding, and header information generation (data file generation).

Evaluation value calculation processing includes processing such as generation of signals and evaluation values for use in autofocus detection (AF) and generation of evaluation values for use in automatic exposure control (AE).

Special effects processing includes processing such as addition of bokeh effects, changing of color tones, and relighting.

Note that these are examples of processing that is applicable by the control circuit 104, and is not intended to limit the processing that is applied by the control circuit 104.

The control circuit 104 is also able to execute AF processing, AE processing and the like based on generated evaluation values.

The non-volatile memory 107 is electrically rewritable. The non-volatile memory 107 stores programs to be executed by the control circuit 104, setting values of the camera 100, GUI (Graphical User Interface) data, and the like.

The working memory 108 is a so-called RAM (Random Access Memory). The working memory 108 is used for loading programs to be executed by the control circuit 104 and for temporarily storing variable values and the like during execution of programs. The working memory 108 is also used as a buffer for image data and as a video memory of a display device 105.

The display device 105 may be a liquid crystal display or an organic EL display, for example. The display device 105 functions as an electronic viewfinder (EVF). The display device 105 may be provided inside the casing of the camera 100 and/or on the casing surface. In the case where the display device 105 is provided inside the casing of the camera 100, the camera 100 has an eyepiece for looking at the display device 105.

Note that the display device 105 may be a device external to the camera 100. In the case where the display device 105 is an external device, the camera 100 outputs data or signals in a format displayable on the connected display device 105.

A storage unit 106 is a semiconductor memory card, for example. Image data (moving image data or still image data) for recording is recorded to the storage unit 106 as data files in a predetermined format by the control circuit 104.

The control circuit 104 causes the display device 105 to function as an EVF by continuously executing shooting of a moving image and operations for generating image data for display from the moving image obtained through shooting and displaying the generated image data for display on the display device 105.

In the present embodiment, a setting priority mode in which processing that reflects current settings is applied to image data for display and a visibility priority mode in which processing for improving the visibility of a shooting scene is applied to image data for display are selectable as display modes of the EVF. The display mode may, for example, be selectable by a user through the operation unit 101, or may be automatically selected by the control circuit 104 according to conditions.

The setting priority mode is a mode in which an image that reflects current settings relating to processing (e.g., contrast correction, exposure correction, saturation correction, etc.) that is applied to the image obtained through shooting is displayed on the EVF. The setting priority mode enables the state of the image that will be recorded if an instruction is given at the current point in time to be checked with the EVF beforehand.

Also, the visibility priority mode is a mode in which an image whose visibility is close to when looking at a subject directly with the naked eye is displayed on the EVF, without reflecting the current settings relating to processing to be applied to the image obtained through shooting. The visibility priority mode enables the EVF to be used instead of observing the scene with the optical viewfinder or the naked eye.

The display mode of the EVF is changeable by the user at any time through operating the operation unit 101, for example. Accordingly, the user is able to change the display mode as appropriate according to his or her intensions while looking through the EVF. Note that other display modes may be included as display modes of the EVF.

The control circuit 104 controls the processing for generating image data for display from RAW data, according to the display mode. Note that RAW data is data in which the signal or data of each pixel has the value of one color component that depends on the color filter. Analog image signals read out of the image sensor 103 and digital image signals (image data) that are obtained through A/D conversion of analog image signals correspond to RAW data.

In the case where the image sensor 103 has color filters in a primary-color Bayer array, the signal or data of each pixel constituting the RAW data has the value of one of R (red), G (green) and B (blue) color components. Processing for converting the signal or data of each pixel from RAW data into a state having the values of multiple color components for representing a color image is called development processing. Development processing includes color interpolation processing.

Processing for Generating Image Data for EVF Display

Figure 2:
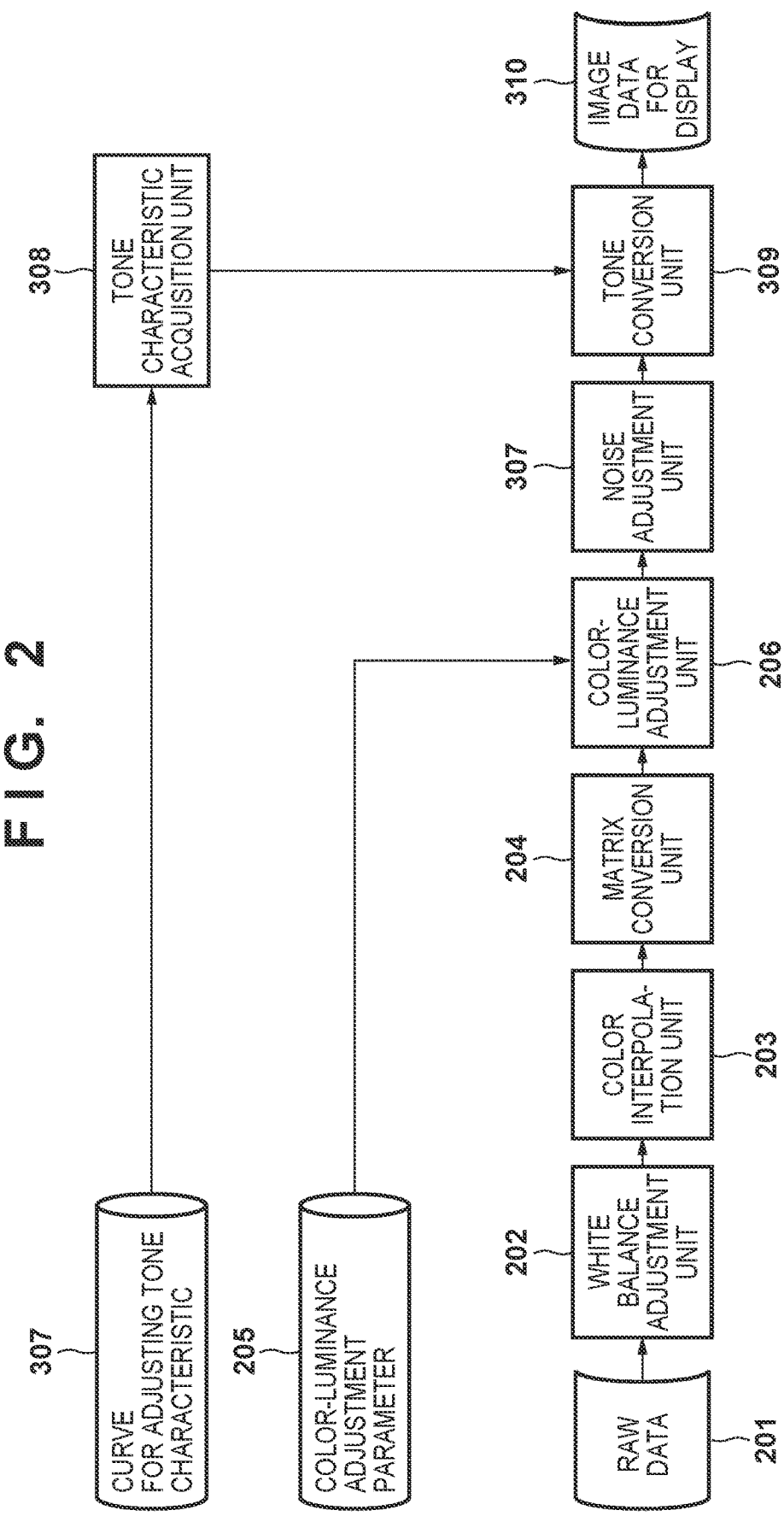
FIG. 2 is a block diagram schematically showing processing for generating image data for display in the embodiment.

The development processing that is applied to the RAW data by the control circuit 104 in order to generate image data for EVF display will be described using FIG. 2. In FIG. 2, a series of development processing that is applied by the control circuit 104 is represented as processing that is realized by the plurality of function blocks 202 to 204 and 206.

As described above, the individual pixel data constituting RAW data 201 has only a value representing the intensity of one color component that depends on the color array of the color filters provided in the image sensor 103. In the present embodiment, the image sensor 103 is provided with color filters in a primary-color Bayer array. In this case, the individual pixel data of the RAW data 201 has a value representing the intensity of one of the color components R (red), G (green) and B (blue), and the remaining two color components do not have a value.

A white balance adjustment unit 202 performs white balance adjustment for correcting color cast due to the light source, in order to make a white subject appear white in the image. Specifically, the white balance adjustment unit 202 plots the RGB data of the pixels constituting the RAW data 201 on the coordinates of a predetermined color space (e.g., xy color space). The white balance adjustment unit 202 then integrates, by color component, the R, G and B values of the pixel data plotted near the blackbody locus which is highly likely to be the light source color in that color space.

The white balance adjustment unit 202 derives a white balance coefficient G/R to be applied to the R component and a white balance coefficient G/B to be applied to the B component from the integral value for each color component. The white balance adjustment unit 202 adjusts the white balance by respectively applying the white balance coefficients to the R component and the B component.

A color interpolation unit 203 supplements the values of color components that the individual pixel data does not have, by noise reduction processing and color interpolation processing. Due to the color interpolation processing, the individual pixel data has the three components R, G and B, and the image data represents a color image.

Thereafter, the image data is converted from RGB format to YUV format by a matrix conversion unit 204. Furthermore, the color component and luminance component that are based on a color-luminance adjustment parameter 205 are adjusted by a color-luminance adjustment unit 206. The color-luminance adjustment parameter 205 is determined based on a user setting made via the operation unit 101, for example.

A noise adjustment unit 307 applies noise reduction processing and sharpness processing that depends on the display mode of the EVF and the shooting scene to adjust the noise feel and resolution feel of the image data. The operations of the noise adjustment unit 307 will be described in detail later.

A tone conversion unit 309 generates image data for display 310 by applying tone conversion to the image data, using a curve (gamma curve) 307 for adjusting a tone characteristic acquired by a tone characteristic acquisition unit 308. The tone conversion unit 309 applies a tone conversion characteristic that differs according to the display mode of the EVF and the shooting scene. The tone conversion characteristic that is applied by the tone conversion unit 309 will be described in detail later.

Image data for display 310 is displayed after being returned to RGB format if necessary, according to the type of display device 105.

In the case of shooting a bright scene such as on a clear day, setting the maximum display luminance of the display device 105 to a high luminance reduces the difference between how the subject appears on the display device 105 (EVF) and how the subject appears when viewed directly with the naked eye. On the other hand, in the case of shooting a dark scene such as a night view, setting the maximum display luminance of the display device 105 to a low luminance reduces the difference between how the subject appears on the display device 105 (EVF) and how the subject appears when viewed directly with the naked eye.

In the present embodiment, the maximum display luminance of the display device 105 is thus changed automatically by the control circuit 104 according to the brightness of the scene to be shot, and the difference between how the subject appears on the EVF and how the subject appears when viewed directly with the naked eye is reduced. The brightness of the scene can be determined based on the luminance evaluation value for AE processing that is generated by the control circuit 104. Alternatively, a sensor for detecting the brightness of the scene may be separately provided, and the control circuit 104 may determine the brightness of the scene based on the brightness that is obtained from this sensor.

Difference in Appearance Depending on Display Mode

Figure 3:
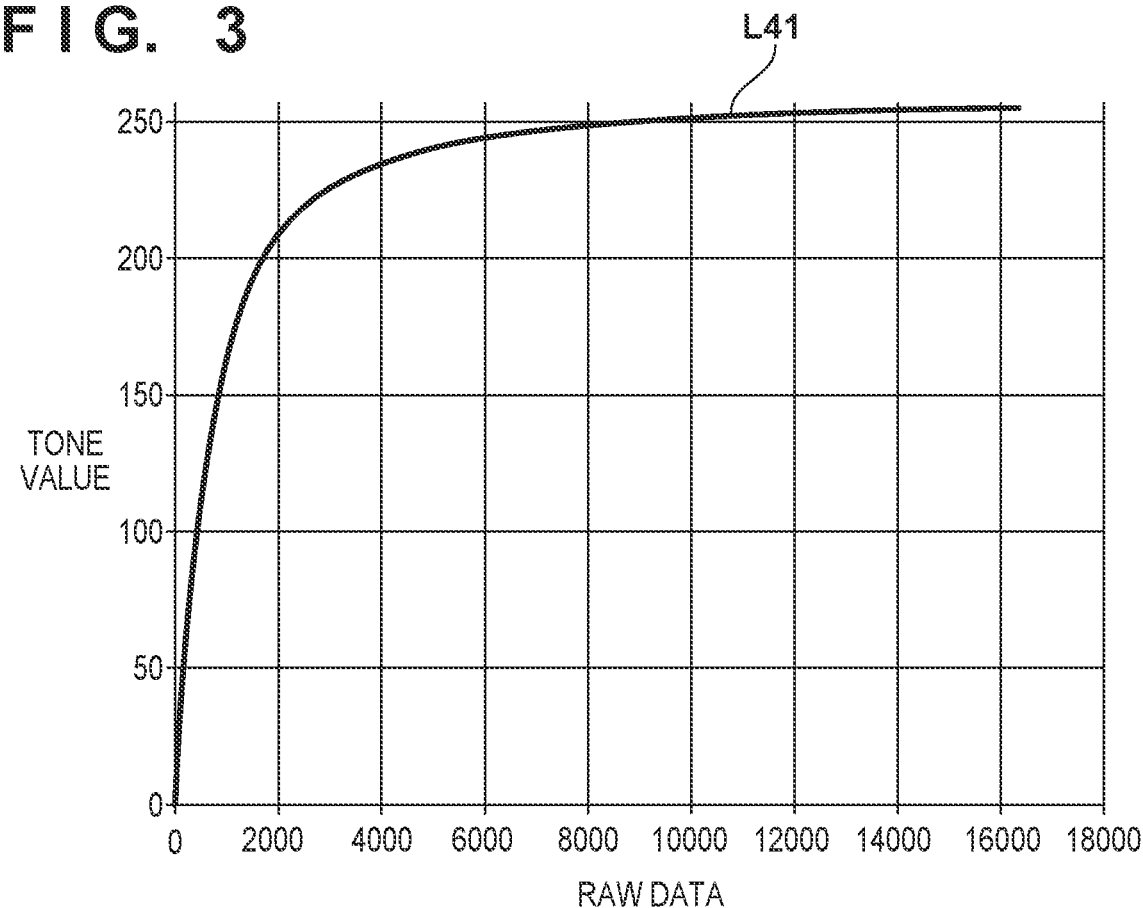
FIG. 3 shows an example input-output characteristic of RAW data and tone value after development processing.

Next, the difference in appearance that occurs between "setting priority mode" and "visibility priority mode" will be described. Here, the case where an input-output characteristic L41 shown in FIG. 3 is selected on the operation unit 101 and the image data for display 310 is displayed by the display device 105 will be considered. Here, the RAW data is a 14-bit value, and the tone is an 8-bit value.

Figure 4A:
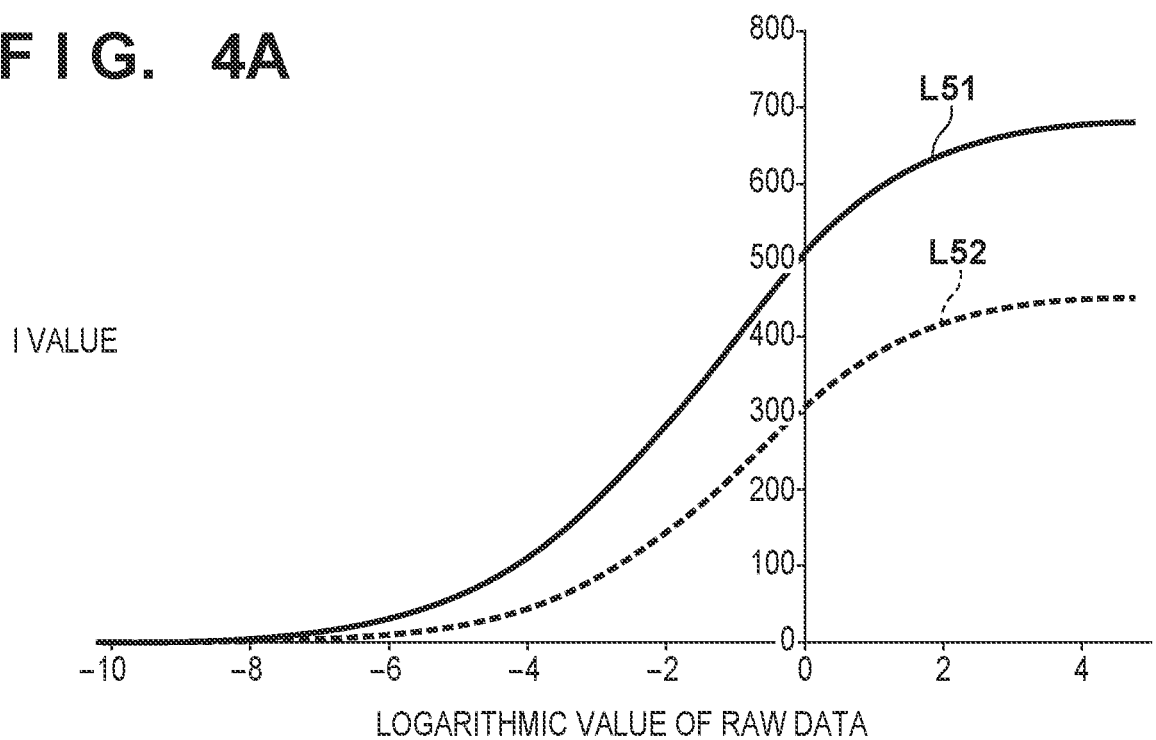
FIG. 4A shows an example of tone characteristics to be used in a setting priority mode.
Figure 4B:
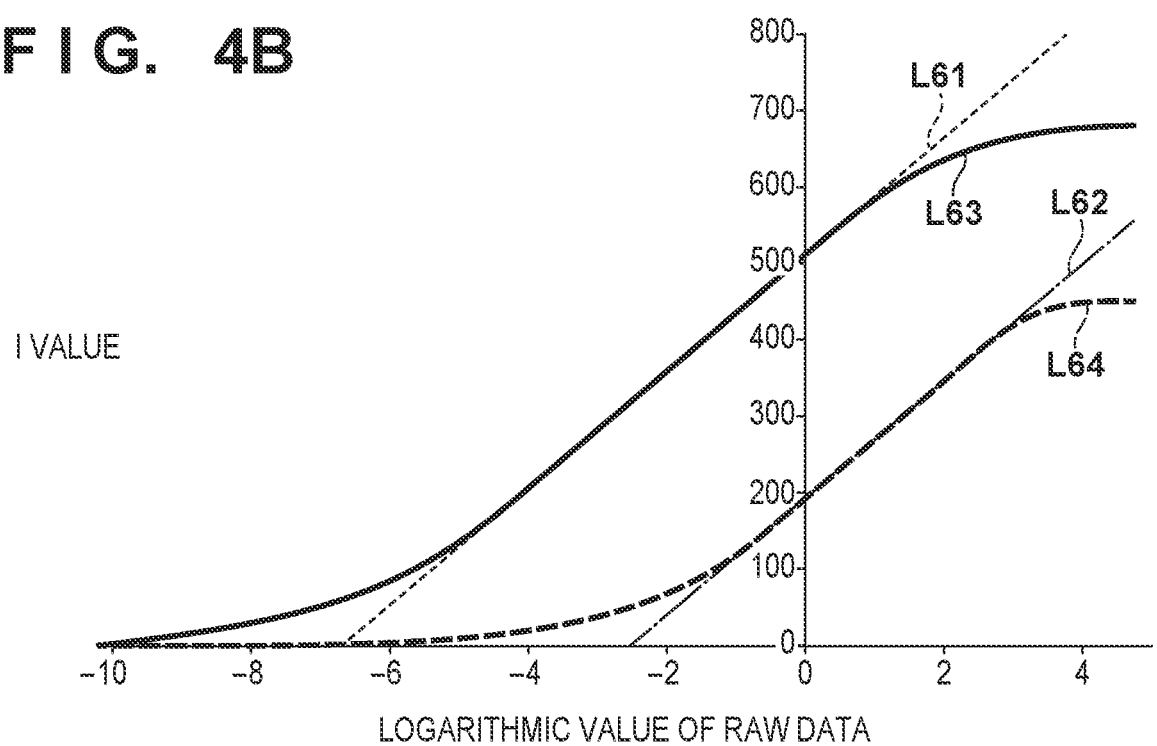
FIG. 4B shows an example of tone characteristics to be used in a visibility priority mode.
Figure 4C:
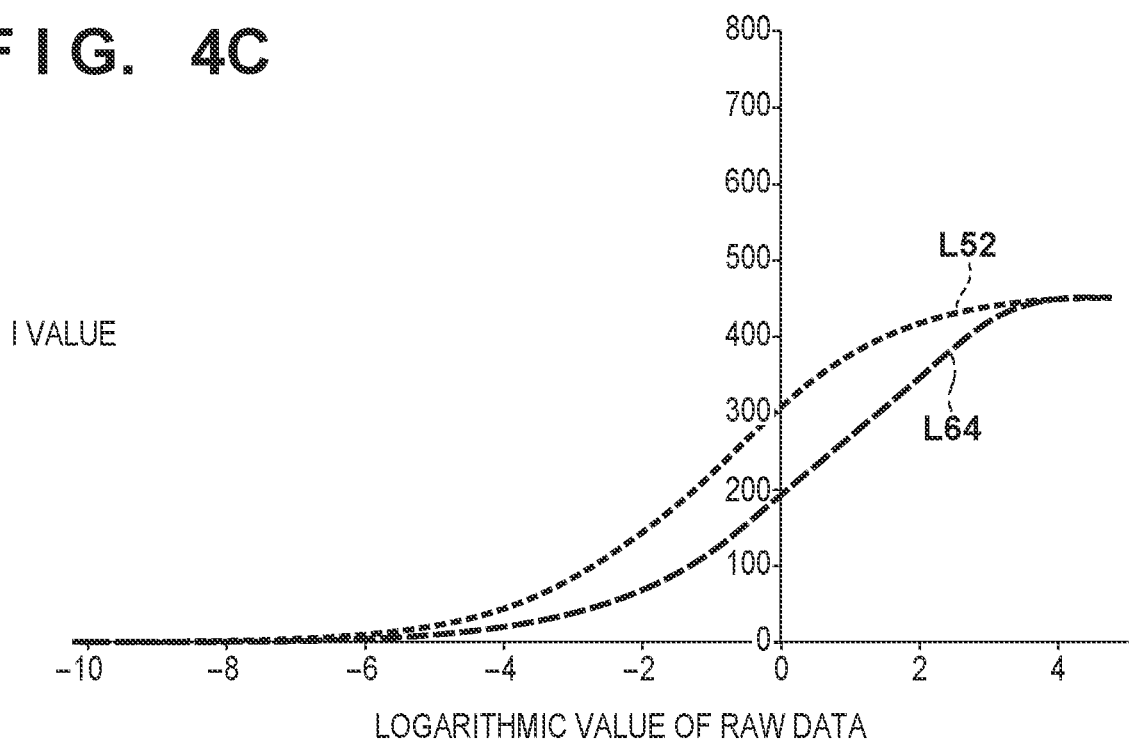
FIG. 4C is a diagram comparing a tone characteristic to be used in the setting priority mode and a tone characteristic to be used in the visibility priority mode.

FIGS. 4A to 4C show the input-output characteristic when taking the logarithmic value of the RAW data serving as the input on the horizontal axis and taking an I value (described in detail later) serving as the output on the vertical axis. Note that the logarithmic value of the RAW data is normalized with a signal value corresponding to the correct exposure, and expressed by a step number with the signal value corresponding to the correct exposure as step 0.

The I value is the value of a luminance component I, among the coordinate values of ICtCp color space, which is a perceptually uniform color space defined by ITU-R BT.2100. As defined in ITU-R BT.2100, an opto-electronic transfer function (OETF) is applied in the process of converting from RGB values to ICtCp values.

In the present embodiment, the inverse (inverse EOTF) of an EOTF (electro-optical transfer function) based on PQ (perceptual quantization) standardized by SMPTE ST 2084 is used as the OETF. In other words, the I value in the diagrams is a value corresponding to the display luminance of the display device 105, and can be converted to the display luminance of the display device 105 by applying PQ EOTF.

FIG. 4A is a diagram showing an example of the conversion characteristic of the RAW data (RGB values) and I value in "setting priority mode". L51 indicates an example of the characteristic for a clear day, and L52 indicates an example of the characteristic for a night view. Note that, in the present embodiment, the I value corresponding to the maximum display luminance of the display device 105 is given as approximately 680 for a clear day and approximately 450 for a night view. Note that these are illustrative examples, and combinations of other values in which the value for a clear day is larger than the value for a night view may be used.

FIG. 4B is a diagram showing an example of the conversion characteristic of the RAW data (RGB values) and I value in "visibility priority mode". L63 indicates an example of the characteristic for a clear day, and L64 indicates an example of the characteristic for a night view. The characteristic L63 is obtained by the slope of a straight line L61 at which the slope where the I value at the correct exposure is generally the same value as the characteristic L51 is approximately 75 being moderated in dark parts and saturated parts. Also, the characteristic L64 is obtained by the slope of a straight line L62 at which the slope where the I value of the maximum display luminance is generally the same value as the characteristic L52 is approximately 75 being moderated in dark parts and saturated parts.

The slope of the portion where the characteristics L63 and L64 change linearly (portions where the straight lines L61 and L62 are directly used) is approximately 75, this being common between the two characteristics. Human sensory characteristics are known to generally be proportional to the logarithmic intensity of a specific stimulus value. The characteristics L63 and L64 that are respectively created based on the straight lines L61 and L62 having the same slope can thus be said to satisfy a perceptually uniform contrast feel. Note that the slope of the straight lines L61 and L62 is given as approximately 75, but can be selected in a range from 65 to 85, for example.

In the case where the display mode of the EVF is the setting priority mode, the tone conversion unit 309 applies a tone characteristic that is in accordance with the characteristic L51 or L52 to the image data. Also, in the case where the display mode of the EVF is the visibility priority mode, the tone conversion unit 309 applies a tone characteristic that is in accordance with the characteristic L63 or L64 to the image data.

With the characteristic L63, the I value at the time of correct exposure is substantially the same as the characteristic L51, and there is also no significant difference in I value from the characteristic L51 in the luminance regions on either side of the correct exposure. Thus, in a situation where the characteristic for a clear day is used, the brightness of the image will be substantially unchanged even when the display mode of the EVF is switched.

FIG. 4C respectively shows the characteristics L52 and L64 for a night view in "setting priority mode" and "visibility priority mode". With the characteristic L64 for a night view in "visibility priority mode", the I value at the correct exposure (step 0) is about 100 lower than the characteristic L52 for a night view in "setting priority mode". This is because display close to the actual appearance is performed in the visibility priority mode. If the I value at the correct exposure was set to be the same, display in the visibility priority mode would give the impression of being brighter than in actual appearance.

In this way, when a tone characteristic that results in the image being darker than in another display mode is applied, visual differences other than apparent brightness may occur between the display modes. This point is expanded on below.

Operation for Adjusting Noise Amount and Resolution Feel in "Viewability Priority Mode"

In the present embodiment, display luminance for a night view in "visibility priority mode" is lowered by a tone characteristic that is applied after the development processing. This is because adjusting the image to be darker in the development processing can cause deterioration in the accuracy of evaluation values or detection values that are based on the image after development processing, and hence deterioration in the accuracy of autofocus, automatic correction processing, and the like.

On the other hand, by darkening the image after development processing, the noise and shoot amplitudes decrease, thus changing the noise feel and resolution feel of the image. Specifically, when "setting priority mode" and "visibility priority mode" are switched for a night view, the resolution feel of EVF display in "visibility priority mode" may seem poor, and the focus peak may be difficult to recognize in manual focus (MF). Also, in "visibility priority mode", EVF display close to the actual appearance is sought, but the resolution feel of display for a night view may seem worse than when the subject is viewed directly with the naked eye.

In view of such issues, in the present embodiment, adjustment is performed by the noise adjustment unit 307 such that the resolution feel and noise feel of EVF display in the visibility priority mode approaches EVF display in the setting priority mode. Specifically, in EVF display for a night view in "visibility priority mode", the noise amount of the image is adjusted by noise processing or sharpness processing.

Hereinafter, operations of the noise adjustment unit 307 and the tone conversion unit 309 will be described in detail using the flowchart of FIG. 5.

In step S801, the noise adjustment unit 307 checks whether the EVF display mode is "setting priority mode" or "visibility priority mode". The current display mode of the EVF can be checked by referring to the non-volatile memory 107 or the working memory 108, for example. The noise adjustment unit 307 executes step S802 if the display mode is the setting priority mode, and execute step S806 if the display mode is the visibility priority mode.

If the display mode is the setting priority mode, the noise adjustment unit 307 sequentially applies, to the image data, NR processing of NR strength A in step S802, sharpness processing of sharpness strength A in step S803, and manual focus peaking detection processing using a peaking threshold value A in step S804. The strengths and threshold values of the various processing that is applied in steps S802 to S804 are determined according to shooting conditions such as exposure and sensitivity, and are not affected by the display conditions of the image (EVF display mode, display luminance, etc.).

In step S805, the tone conversion unit 309 applies tone conversion A to the image data. Tone conversion A is tone conversion that is applied in accordance with the characteristic L51 or L52 shown in FIG. 4A, for example. The tone conversion unit 309 is able to select the characteristic L51 for a clear day in the case where an evaluation value (e.g., Bv value) of the brightness of the scene that is obtained from the image data is higher than a threshold value, and to select the characteristic L52 for a night view if the evaluation value is less than or equal to the threshold value. The evaluation value can be derived with the noise adjustment unit 307, with the tone conversion unit 309, or with other processing executed by the control circuit 104.

In step S806, the noise adjustment unit 307 determines whether the brightness of the scene exceeds a threshold value. Here, as an example, the noise adjustment unit 307 determines that the brightness of the scene exceeds the threshold value if the above-described Bv value is greater than a threshold value and executes step S807, and executes step S811 if the By value is less than or equal to the threshold value.

Here, the purpose is to differentiate whether the scene is a clear day scene or a night view scene, and thus a threshold value that enables these scenes to be differentiated is determined. Different threshold values may be used for each scene if necessary.

In the case of a bright scene, the noise adjustment unit 307 sequentially applies, to the image data, noise reduction (NR) processing of NR strength A in step S807, sharpness processing of sharpness strength A in step S808, and MF peaking detection processing using the peaking threshold value A in step S809. This various processing is the same as steps S802 to S804 in the setting priority mode. In other words, in the case of a bright scene, the adjustment of noise amount and resolution feel is common between the visibility priority mode and the setting priority mode.

In step S810, the tone conversion unit 309 applies tone conversion B to the image data. Tone conversion B is tone conversion that is applied in accordance with the characteristic L63 or L64 shown in FIG. 4B, for example. The tone conversion unit 309 applies the characteristic L63 for a clear day if it is determined that the Bv value is greater than a threshold value in step S806, and applies tone conversion in accordance with the characteristic L64 for a night view if it is determined that the By value is less than or equal to the threshold value.

If it is determined that the By value is less than or equal to the threshold value in step S806, the noise adjustment unit 307 sequentially applies, to the image data, NR processing of NR strength B in step S811, sharpness processing of sharpness strength B in step S812, and MF peaking detection processing using a peaking threshold value B in step S813.

Here, in the NR processing of step S811, NR strength B is made weaker than NR strength A, in order to leave more of a noise feel than in the case of a bright scene and to suppress a decrease in the resolution feel due to the noise reduction processing. Also, in the sharpness processing of step S812, sharpness strength B is made stronger than sharpness strength A, in order to enhance the resolution feel compared to the case of a bright scene.

Also, in the peaking processing of step S813, the peaking threshold value B is set higher than the peaking threshold value A, narrowing the range of values that are judged to be the peak, such that the peak of the degree of focus is easier to recognize than in the case of a bright scene.

In this way, in the case where the display mode of the EVF is "visibility priority mode" and a tone characteristic that results in the image at the time of correct exposure being darker is applied, processing is applied that increases the noise feel and resolution feel compared to the case where a tone characteristic that does not result in the image at the time of correct exposure being darker is applied. It is thereby possible to suppress the sense that the resolution feel of EVF display has deteriorated or that the focus peak is more difficult to recognize, when the user switches the display mode from the setting priority mode to the visibility priority mode.

Note that application of the NR processing and sharpness processing at NR strength B and sharpness strength B that are applied in step S811 and step S812 in the visibility priority mode can be limited to a specific display luminance region.

The application of NR processing of NR strength B will now be described. L91 in FIG. 6A indicates the difference between the characteristic L52 of "setting priority mode" and the characteristic L64 of "visibility priority mode" that are used when the shooting scene is not bright.

It is then possible to apply the NR processing of NR strength B to a luminance region in which the difference in I value (i.e., display luminance) between the display modes represented by L91 is greater than or equal to a threshold value, and to apply the NR processing of NR strength A to the remaining luminance region.

Figure 6A:
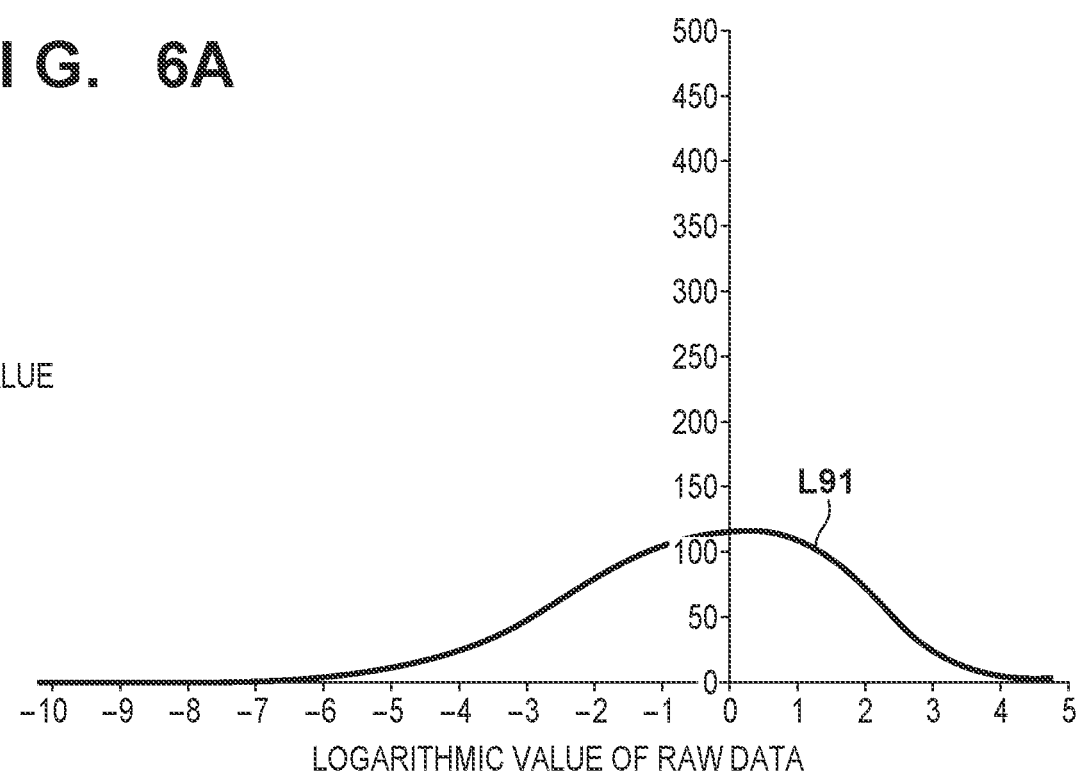
FIGS. 6A and 6B are diagrams relating to a variation limiting a luminance region to which noise amount adjustment processing is applied.
Figure 6B:
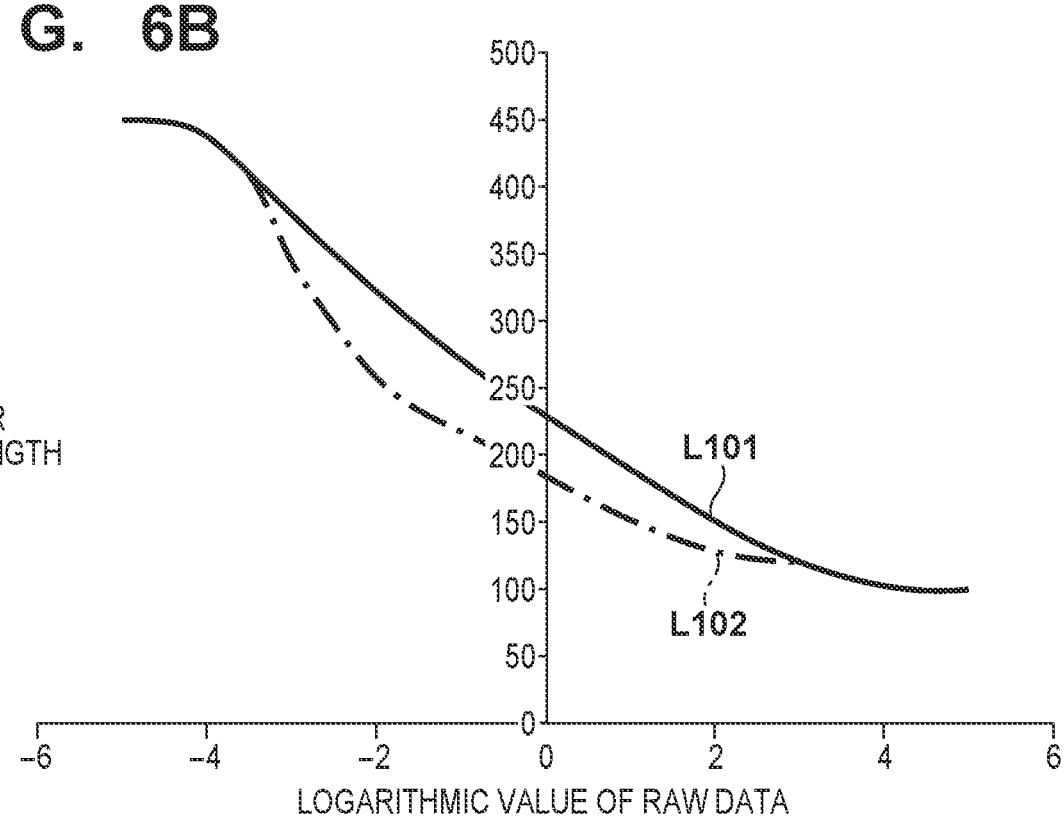

FIG. 6B is a diagram showing an example relationship between luminance and NR strength in the case where NR strength B is set for a luminance region in which the value of the difference in I value of the tone characteristics is greater than or equal to 50 and NR strength A is set for the remaining luminance region. Here, L101 indicates the characteristic of NR strength A that is used for a night view in "setting priority ode". Also, L102 indicates an example characteristic of the luminance region in which NR strength B is used for a night view in "visibility priority mode".

The luminance region in which the characteristic L91 shown in FIG. 6A is greater than or equal to 50 is a section from roughly step −3 to step +2.5 in the logarithmic value of RAW data on the horizontal axis. Thus, the characteristic of NR processing also uses the characteristic L102 of NR strength B obtained by weakening the NR strength to roughly 0.8 times NR strength A shown with the characteristic L101 in the same luminance region.

Similarly, for the sharpness processing, sharpness strength B can be set only for a luminance region in which the value of the difference in I value of the tone characteristics is greater than or equal to the threshold value, and the sharpness strength A can be set for the remaining luminance region.

Note that, here, an example has been described in which adjustment of the noise feel and resolution feel is limited to a luminance region in which the difference in I value between the input-output characteristics of the RAW data (luminance of image data) and the I value (value corresponding to display luminance) is greater than or equal to a threshold value. However, the luminance region in which the noise feel and resolution feel are adjusted may be determined by other methods. For example, the luminance region to be targeted may be determined by another method based on the I value, such as targeting a luminance region corresponding to the I value of mean±standard deviation. Alternatively, the luminance region to be targeted may be determined based on a variable other than the I value, such as the scene luminance or the display luminance.

Note that the NR processing at NR strength B in step S811 and the sharpness processing at sharpness strength B in step S812 may be applied to the entire luminance region.

Variations

Figure 5:
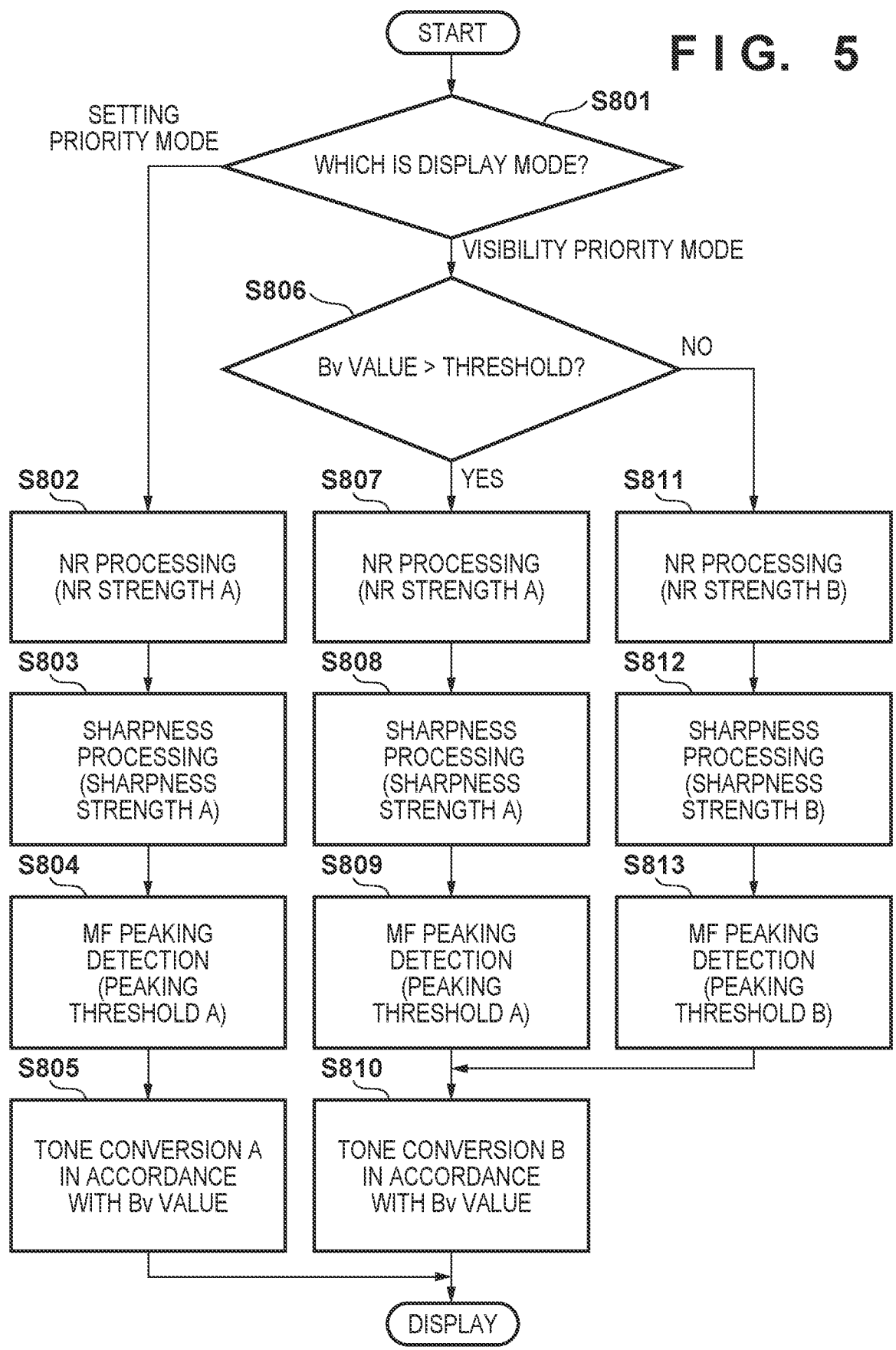
FIG. 5 is a flowchart relating to noise amount adjustment processing in the embodiment.

In the flowchart of FIG. 5, if the visibility priority mode is set, the strength of the NR processing and sharpness processing and the threshold value that is used in the MF peaking detection processing are changed according to the brightness of the shooting scene. However, these changes may be made according to other conditions.

For example, the noise adjustment unit 307, in step S806, may determine whether the situation requires a resolution feel in EVF display, and execute step S811 if it is determined that the situation requires a resolution feel in FAT display, and step S807 if it is not determined that the situation requires a resolution feel in FAT display. A situation that requires a resolution feel in EVF display is, for example, the case where the focus mode is set to manual focus (MF).

In this case, the tone characteristic that is applied in step S810 when it is determined that the situation requires a resolution feel in EVF display need not necessarily be a tone characteristic that darkens the image such as the characteristic L64. For example, the same tone characteristic may be applied when it is determined that the situation requires a resolution feel in EVF display and when it is not determined that the situation requires a resolution feel in EVF display, and only the strengths of the NR processing and sharpness processing may be changed.

Also, in the flowchart of FIG. 5, in the case where the shooting scene is not bright in "visibility priority mode", three variables, namely, the NR strength, sharpness strength and peaking threshold value, are changed. But all of these variables need not always be changed.

For example, the effects of the present invention are obtained by changing one or more of these variables, such as changing only the NR strength. FIG. 7 is, similarly to FIG. 5, a flowchart in which operations of the noise adjustment unit 307 and the tone conversion unit 309 in the case where only NR strength is changed are shown in detail. In FIG. 7, blocks that perform the same processing as FIG. 5 are given the same reference numerals as FIG. 5.

If it is determined that the By value is less than or equal to the threshold value in step S806, the noise adjustment unit 307 executes NR processing of NR strength B in step S811. Thereafter, the noise adjustment unit 307 executes steps S808 and S809, and applies sharpness processing and MF peaking detection processing similar to the case where the Bv value is not determined to be less than or equal to the threshold value in step S806.

In this way, even in the case where only one of NR strength and sharpness strength is changed, the processing may be applied to the luminance region as a whole or to a specific part thereof.

As described above, according to the present embodiment, in the image processing apparatus that generates image data for display by applying a tone characteristic that depends on the display mode, processing for enhancing the resolution feel of the image is applied, in the case where a tone characteristic that results in the resolution feel of the image decreasing is applied. Thus, the difference in the resolution feel of an mage due to a difference in display mode can be suppressed, and a change in usability due to the display mode can be suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-188074, filed on Nov. 18, 2021, which is hereby incorporated by reference herein in its entirety.

What is claimed is:

1. An image processing apparatus comprising:
one or more processors that, when executing a program stored in a memory, function as:
an acquisition unit configured to acquire image data obtained through shooting; and
a generation unit configured to generate, from the image data, image data for display that depends on a display mode being set,
wherein the generation unit
in generation of the image data for display, applies a tone characteristic that depends on the display mode being set, to the image data, and
in a case where a tone characteristic to be applied to the image data while a first display mode is set is a tone characteristic that darkens an image compared to a tone characteristic to be applied to the image data while a second display mode is set,
weakens noise reduction processing to be applied to the image data compared to noise reduction processing to be applied to the image data while the second display mode is set, and/or
strengthens sharpness processing to be applied to the image data compared to sharpness processing to be applied to the image data while the second display mode is set.

2. The image processing apparatus according to claim 1, wherein the generation unit further,
in a case where the tone characteristic to be applied to the image data while the first display mode is set, is the tone characteristic that darkens the image compared to the tone characteristic to be applied to the image data while the second display mode is set,
increases a threshold value in manual focus peaking detection processing to be applied to the image data compared to a threshold value in manual focus peaking detection processing to be applied to the image data while the second display mode is set.

3. The image processing apparatus according to claim 1, wherein the tone characteristic that darkens the image compared to the tone characteristic to be applied to the image data while the second display mode is set, is applied to the image data in a case where a brightness of a scene to be shot while the first display mode is set is less than or equal to a threshold value.

4. The image processing apparatus according to claim 1, wherein the generation unit further,
in a case where manual focus is set while the first display mode is set, compared to a case where manual focus is not set,
weakens the noise reduction processing to be applied to the image data and/or
strengthens the sharpness processing to be applied to the image data.

5. The image processing apparatus according to claim 1, wherein the generation unit makes the strength of the noise reduction processing and/or sharpness processing while the first display mode is set different from the strength of the noise reduction processing and/or sharpness processing while the second display mode is set for a specific luminance region of the image data.

6. The image processing apparatus according to claim 1, wherein the tone characteristic to be applied to the image data is a tone characteristic representing a relationship between a logarithmic value of the image data and an I value in ICtCp color space.

7. The image processing apparatus according to claim 5, wherein the tone characteristic to be applied to the image data is a tone characteristic representing a relationship between a logarithmic value of the image data and an I value in ICtCp color space, and the specific luminance region is a luminance region in which a difference in I value from the tone characteristic to be applied to the image data while the second display mode is set, is greater than or equal to a threshold value.

8. The image processing apparatus according to claim 7, wherein the tone characteristic to be applied to the image data in the first display mode is a tone characteristic with which the I value changes linearly with respect to a change in the logarithmic value of the image data in a specific luminance region that includes correct exposure.

9. An image capturing apparatus comprising:
an image sensor; and
an image processing apparatus configured to process image data obtained through shooting that uses the image sensor,
wherein the image processing apparatus comprising:
one or more processors that, when executing a program stored in a memory, function as:
an acquisition unit configured to acquire image data obtained through shooting; and
a generation unit configured to generate, from the image data, image data for display that depends on a display mode being set,
wherein the generation unit
in generation of the image data for display, applies a tone characteristic that depends on the display mode being set, to the image data, and
in a case where a tone characteristic to be applied to the image data while a first display mode is set is a tone characteristic that darkens an image compared to a tone characteristic to be applied to the image data while a second display mode is set,
weakens noise reduction processing to be applied to the image data compared to noise reduction processing to be applied to the image data while the second display mode is set, and/or
strengthens sharpness processing to be applied to the image data compared to sharpness processing to be applied to the image data while the second display mode is set.

10. The image capturing apparatus according to claim 9, wherein the image data for display generated by the image processing apparatus is used for display on a display device that functions as an electronic viewfinder.

11. The image capturing apparatus according to claim 9, further comprising:
an operation unit,
wherein the first display mode and the second display mode are switchable in response to an operation on the operation unit.

12. An image processing method for execution by an image processing apparatus, the method comprising:
acquiring image data obtained through shooting; and
generating, from the image data, image data for display that depends on a display mode,
wherein, in the generating,
in generation of the image data for display, noise reduction processing, sharpness processing and a tone characteristic that depends on the display mode are applied to the image data, and
in a case where a tone characteristic to be applied to the image data in a first display mode is a tone characteristic that darkens an image compared to a tone characteristic to be applied to the image data in a second display mode,
noise reduction processing to be applied to the image data is weakened compared to noise reduction processing to be applied to the image data while the second display mode is set, and/or
sharpness processing to be applied to the image data is strengthened compared to sharpness processing to be applied to the image data while the second display mode is set.

13. A non-transitory computer-readable medium storing a program for causing a computer, when executing the program, to function as an image processing apparatus comprising:
an acquisition unit configured to acquire image data obtained through shooting; and
a generation unit configured to generate, from the image data, image data for display that depends on a display mode being set,
wherein the generation unit
in generation of the image data for display, applies a tone characteristic that depends on the display mode being set, to the image data, and
in a case where a tone characteristic to be applied to the image data while a first display mode is set is a tone characteristic that darkens an image compared to a tone characteristic to be applied to the image data while a second display mode is set,
weakens noise reduction processing to be applied to the image data compared to noise reduction processing to be applied to the image data while the second display mode is set, and/or
strengthens sharpness processing to be applied to the image data compared to sharpness processing to be applied to the image data while the second display mode is set.

* * * * *